United States Patent
Cheng

(10) Patent No.: US 10,625,615 B2
(45) Date of Patent: Apr. 21, 2020

(54) BATTERY MANAGEMENT SYSTEM

(71) Applicant: Thunder Power New Energy Vehicle Development Company Limited, Central (HK)

(72) Inventor: Ming-Chieh Cheng, Taoyuan (TW)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 225 days.

(21) Appl. No.: 15/914,767

(22) Filed: Mar. 7, 2018

(65) Prior Publication Data

US 2018/0194243 A1    Jul. 12, 2018

Related U.S. Application Data

(63) Continuation of application No. 15/190,455, filed on Jun. 23, 2016, now Pat. No. 9,931,956.

(Continued)

(51) Int. Cl.
*B60L 50/50* (2019.01)
*B60L 11/18* (2006.01)
(Continued)

(52) U.S. Cl.
CPC ............ *B60L 11/1851* (2013.01); *B60L 3/12* (2013.01); *B60L 50/50* (2019.02); *B60L 58/10* (2019.02); *B60L 58/14* (2019.02); *H01M 10/425* (2013.01); *H02J 9/005* (2013.01); *B60L 2240/545* (2013.01); *B60L 2240/547* (2013.01); *B60L 2240/80* (2013.01); *H01M 2010/4271* (2013.01); *H01M 2010/4278* (2013.01);
(Continued)

(58) Field of Classification Search
CPC ...... B60L 11/1851; B60L 50/50; B60L 58/10; B60L 58/14; B60L 3/12; B60L 2240/545; B60L 2240/547; B60L 2240/80; H01M 10/425; H01M 2010/4271; H01M 2010/4278; H01M 2220/20; H02J 9/005; Y02T 10/7005; Y02T 10/705; Y02T 10/92
See application file for complete search history.

(56) References Cited

U.S. PATENT DOCUMENTS 5,698,967 A *  12/1997  Baer ................... B60L 58/25
                                                    320/152
6,445,163 B1 *  9/2002  Chenier ................ H02J 3/14
                                                    320/130

(Continued)

*Primary Examiner* — Calvin Cheung
(74) *Attorney, Agent, or Firm* — Kilpatrick Townsend & Stockton

(57) ABSTRACT

Vehicle battery management systems (BMS) and methods are described, in which the output of a vehicle battery is reduced by activating a shutdown mode. A BMS may be configured to start a timer when the vehicle is turned off, e.g. based on when the main power between the vehicle and the battery is interrupted or based on a signal from the vehicle control system. The BMS may further be configured to store BMS data (e.g. variable data related to operation and/or status of the battery) to an electronic storage device, and to switch the battery to a shutdown mode, when the timer reaches a predetermined value. The BMS may be further configured to load the BMS data from the electronic storage device and/or to deactivate the shutdown mode when the vehicle is turned back on.

20 Claims, 5 Drawing Sheets

Related U.S. Application Data

(60) Provisional application No. 62/272,709, filed on Dec. 30, 2015.

(51) Int. Cl.
    *H02J 9/00*         (2006.01)
    *B60L 3/12*         (2006.01)
    *H01M 10/42*       (2006.01)
    *B60L 58/14*       (2019.01)
    *B60L 58/10*       (2019.01)

(52) U.S. Cl.
    CPC ........ *H01M 2220/20* (2013.01); *Y02T 10/705* (2013.01); *Y02T 10/7005* (2013.01); *Y02T 10/92* (2013.01)

(56) References Cited

U.S. PATENT DOCUMENTS

| | | | |
|---|---|---|---|
| 6,680,878 B1* | 1/2004 | Minabe | G11B 15/023 |
| | | | 348/E5.127 |
| 2014/0009117 A1* | 1/2014 | Ishii | H02J 7/34 |
| | | | 320/126 |
| 2014/0015469 A1* | 1/2014 | Beaston | H02J 3/32 |
| | | | 320/101 |
| 2014/0210267 A1* | 7/2014 | Ishida | H02J 7/0021 |
| | | | 307/31 |
| 2017/0052229 A1* | 2/2017 | Eckert | H01M 10/48 |
| 2017/0331162 A1* | 11/2017 | Clarke | H01M 10/446 |
| 2018/0246552 A1* | 8/2018 | Thompson | G06F 11/3058 |
| 2019/0242949 A1* | 8/2019 | Lemkin | H01M 10/425 |

* cited by examiner

BATTERY MANAGEMENT SYSTEM

CROSS-REFERENCE TO RELATED APPLICATIONS

The present application is a continuation of U.S. Non-provisional appplication Ser. No. 15/190,455, filed on Jun. 23, 2016, which claims priority to U.S. Provisional Patent Application No. 62/272,709, filed on Dec. 30, 2015, entitled BATTERY MANAGEMENT SYSTEM, the entire disclosures of which are incorporated by reference for all purposes.

BACKGROUND

Exemplary embodiments of the present disclosure relate to battery management systems that may be used, for example, for managing power output and modes of one or more batteries in an electric vehicle.

An electric vehicle uses a battery pack as an energy source. To ensure that the electric vehicle operates properly, the battery pack is monitored and managed during discharge and charging, e.g. to maintain the battery pack within a certain range of temperature and other parameters. Operating within the working temperature ensures that the battery pack performs efficiently and has a long service life. Due to the large influence of temperature on the performance and the service life of the battery pack, the working temperature of the battery pack and the consistency of the working states of the battery cells within the battery pack are very important in the design of the electric vehicle and the battery pack. As such a battery management system (BMS) is typically used to manage the performance and operation of a rechargeable battery (e.g. a cell or battery pack), by protecting the battery from operating outside its working temperature, monitoring its state, and calculating and/or reporting data to other control systems in the vehicle. The BMS may also control recharging of the battery, e.g. by redirecting recovered or charger energy to the battery pack.

When an electrical vehicle is turned off, may maintain operation of at least some electrical subsystems that slowly drain the battery. This can result, for example, in "leakage" of 13 mA-4 mA of current from the battery.

SUMMARY

Exemplary embodiments of the present disclosure may address at least some of the above-noted problems. For example, according to first aspects of the disclosure, a vehicle battery management system (BMS) may be configured to start a timer when the vehicle is turned off, e.g. based on when the main power between the vehicle and the battery is interrupted or based on a signal from the vehicle control system. The BMS may further be configured to store BMS data (e.g. variable data related to operation and/or status of the battery) to an electronic storage device, and to switch the battery to a shutdown mode, when the timer reaches a predetermined value (or expires if configured as a countdown timer). In embodiments, the BMS may be further configured to load the BMS data from the electronic storage device and/or to deactivate the shutdown mode when the vehicle is turned back on, e.g. based on the main power between the vehicle and the battery being reactivated, and/or a signal from the vehicle control system indicating that the vehicle is turned "on."

According to further aspects of the invention, a vehicle battery management system (BMS), may include one or more of a main power monitor, a counter and/or a controller including a microprocessor. The main power monitor may be configured to determine when main power between a vehicle and a battery is detected, and/or when the main power between the vehicle and the battery is not detected. The counter may be configured to begin counting based at least in part on the main power monitor determining that the main power between the vehicle and the battery is not detected. The controller may be configured to store BMS data to an electronic storage device and to switch the battery to a shutdown mode based at least in part on the counter reaching a predetermined value. In embodiments, the controller may be further configured to load the BMS data from the electronic storage device and/or to deactivate the shutdown mode based at least in part on the main power monitor determining that the main power between the vehicle and the battery is detected.

In embodiments, the predetermined value may correspond to a time in a range between 12 hours and 36 hours; or to a time of about 24 hours.

In embodiments, the shutdown mode may limit a current from the battery to about 1 mA or less.

In embodiments, the BMS may be included in a battery pack including the battery, or it may be included in other control system(s) of the vehicle (or combinations thereof).

In embodiments, the controller may be configured to reset the counter based at least in part on the main power monitor determining that the main power between the vehicle and the battery is restored before activation of the shutdown mode.

In embodiments, the controller may be configured to adjust the predetermined value for the counter when the counter is reset based on the main power monitor determining that the main power between the vehicle and the battery is restored before activation of the shutdown mode.

In embodiments, the controller may be configured to switch the battery to a standby mode based at least in part on the main power monitor determining that the main power between the vehicle and the battery is not detected, the standby mode limiting a current from the battery to a range of about 6 mA to 2 mA.

According to further aspects of the invention, an electric vehicle may be provided including a battery; an electric motor configured to be powered by the battery; and a vehicle battery management system (BMS). In embodiments, the BMS may include a main power monitor, configured to determine when main power between the vehicle and the battery is detected, and when the main power between the vehicle and the battery is not detected; a counter, configured to begin counting based at least in part on the main power monitor determining that the main power between the vehicle and the battery is not detected; and a controller, configured to store BMS data to an electronic storage device and to switch the battery to a shutdown mode based at least in part on the counter reaching a predetermined value. In embodiments, the controller may be configured to load the BMS data from the electronic storage device and to deactivate the shutdown mode based at least in part on the main power monitor determining that the main power between the vehicle and the battery is detected.

In embodiments, the controller may be configured to switch the battery to a standby mode based at least in part on the main power monitor determining that the main power between the vehicle and the battery is not detected, the standby mode limiting a current from the battery to a range of, for example, about 6 mA to 2 mA.

In embodiments, the controller may be configured to control operating parameters of the battery during a working mode in which power is provided from the battery to the motor.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION

Figure 1:
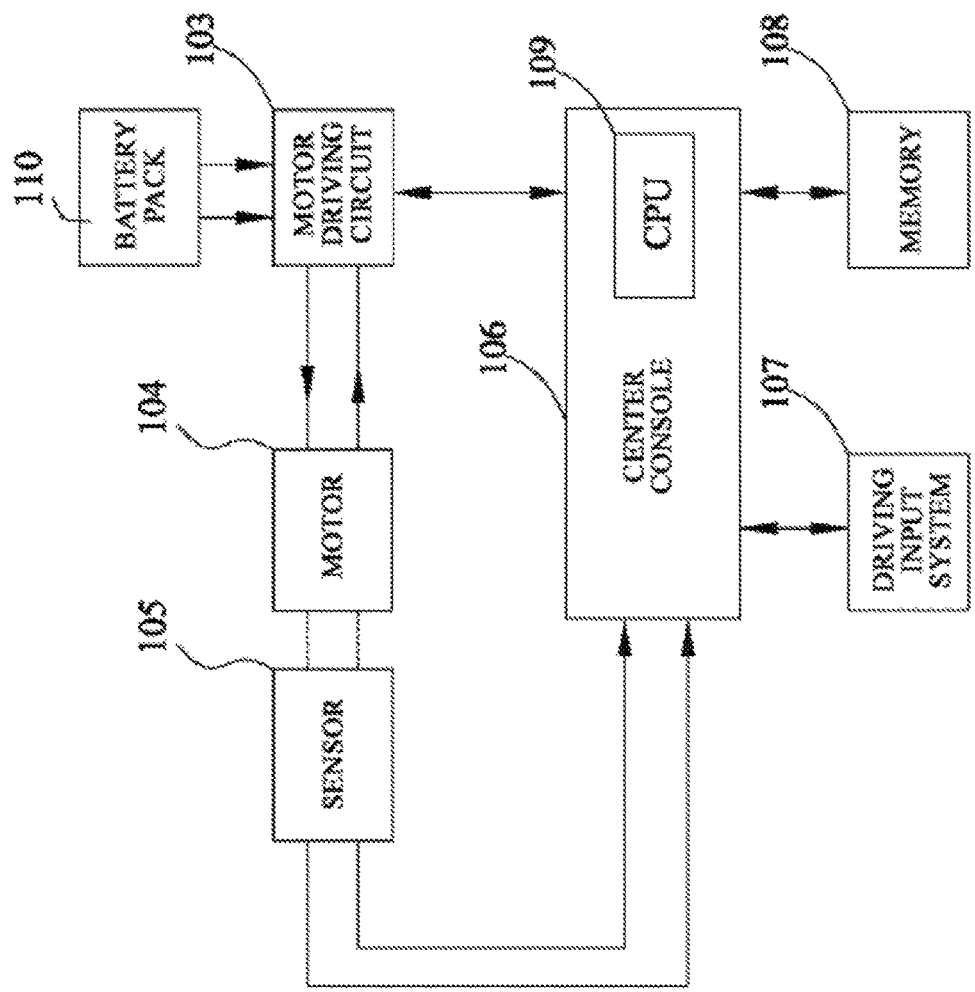
FIG. 1 is a schematic diagram of an exemplary electric vehicle motor efficiency control system according to aspects of the present disclosure.

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

As used herein, the use of the terms "about" or "approximately" should be interpreted as within 20% of a given value, unless otherwise specified. The term "substantially" should be interpreted as encompassing greater than 75% of a thing, e.g. a component that is made "substantially" of plastic would comprise greater than 75plastic.

FIG. 1 is a schematic diagram of an exemplary electric vehicle motor efficiency control system according to aspects of the present disclosure. As shown in FIG. 1, a control system for controlling an electric vehicle may include a battery pack 110, a motor driving circuit 103, a motor 104, a sensor 105, a center console 106 (including a CPU 109), a driving input system 107, a memory 108 and the like. The battery pack 110 provides the motor 104 with operating power; the motor driving circuit 103 may be connected between the motor 104 and the battery pack 110 to transmit the power of the battery pack 110 to the motor 104, and the working state of the motor 104 may be controlled by controlling the voltage/current transmitted to the motor 104. The sensor 105 may be used for sensing the current operating parameters (e.g. the speed and the torque) of the motor 104 and sending the operating parameters to the center console 106. According to these parameters, the center console 106 can judge the current operating state of the motor 104 and send a control signal to the motor driving circuit 103 to change the voltage/current input to the motor 104, thus changing the operating state of the motor. The center console 106 may be further connected with the driving input system 107 and the memory 108. The driving input system 107 may be configured to input the target operating state of the motor 104 to the center console 106, the memory 108 may be used to store a motor operational model, and the center console 106 may be configured to read data from and write data into the motor operational model.

In embodiments, the battery pack 110 (and/or motor driving circuit 103 or CPU 109) may be configured with a BMS as described herein. Further details of an exemplary battery pack are shown in FIG. 2.

Figure 2:
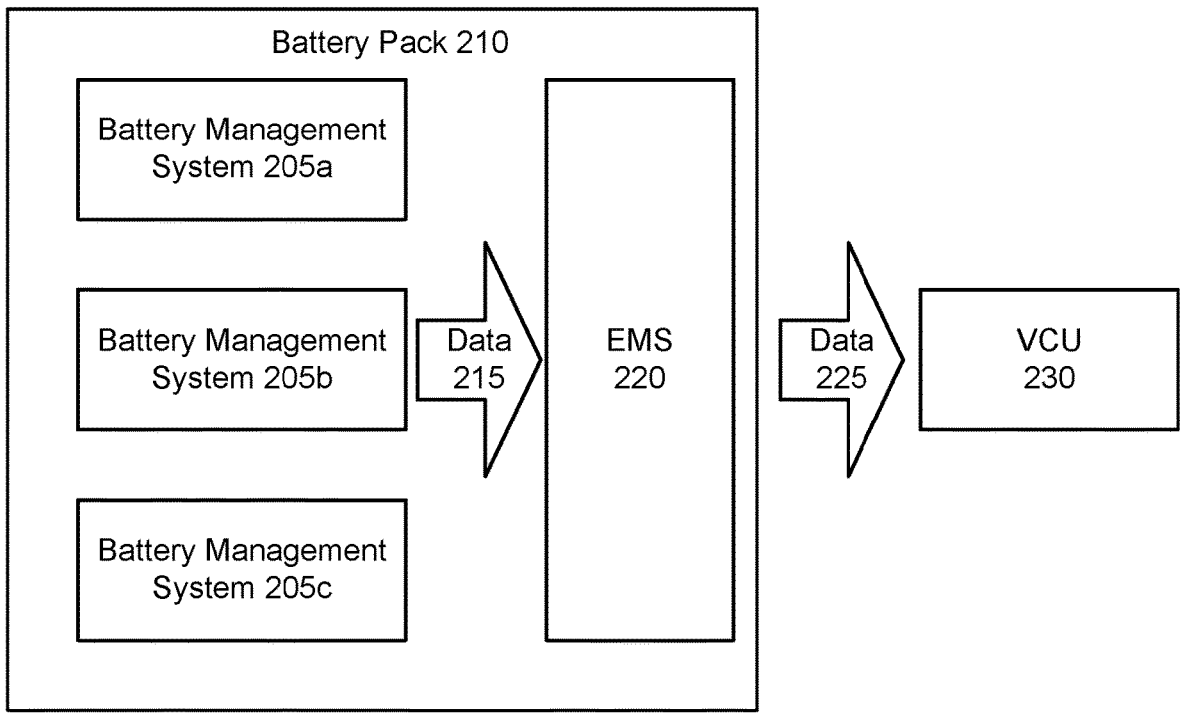
FIG. 2 is a schematic diagram of an exemplary battery pack according to aspects of the present disclosure.

FIG. 2 is a schematic diagram of an exemplary battery pack 210 according to aspects of the present disclosure. As shown in FIG. 2, battery pack 210 may include a number of BMS 205a-205c, each configured to manage separate batteries or cells (not shown). Battery pack 201 includes features that allow data communication between the battery pack 210 and other control subsystems, such as discussed herein. It is noted that the configuration depicted in FIG. 2 is merely exemplary, and that the information gathering and processing discussed herein can be implemented in various other ways.

As shown in FIG. 2, the EMS (Energy Management System) 220 collects modular information 215 from BMS (Battery Management System) 205a-205c, calculates and integrates the data 225, and then sends the results from the calculation(s) to VCU (Vehicle Control Unit) 230 for further judgments and/or control operations. In some examples, the battery pack 210 can implement a master-slave communication structure. EMS 220 can accumulate and collect all the data 215 from each BMS 205a-205c on every module, and perform data calculation and treatment. By way of further example, battery pack 210 can communicate with the VCU 230 responsive to the vehicle being activated (e.g. detecting main power between the battery and the vehicle). The battery pack 210 can also communicate with a charger (not shown) responsive to the vehicle being charged. The battery pack 210 may also communicate with a maintenance computer (not shown) responsive to UI or other software application being connected to the battery pack, e.g. to facilitate maintenance, diagnostics, etc. Additional details regarding the configuration of an individual BMS are shown in FIG. 3.

Figure 3:
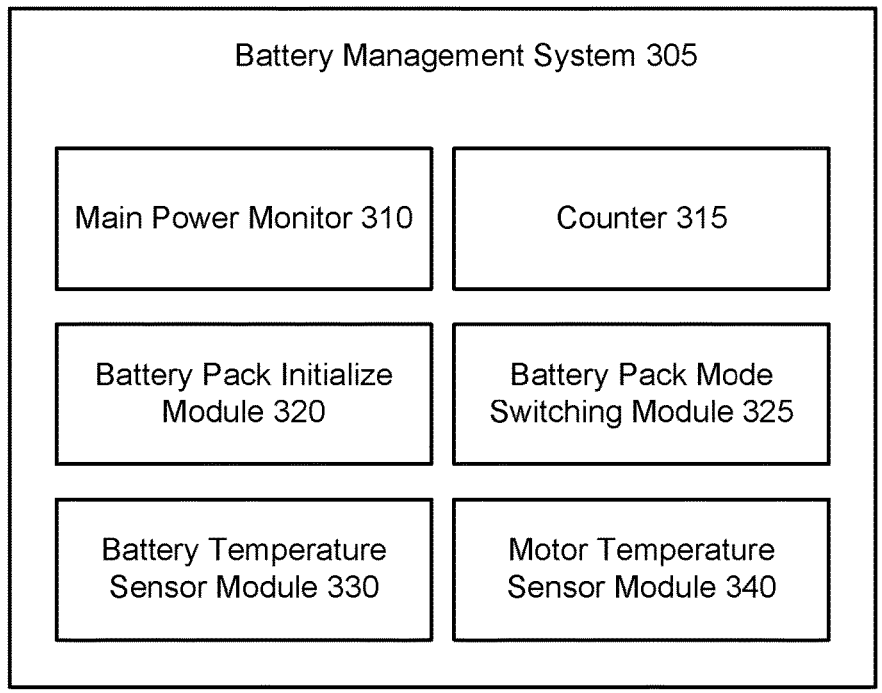
FIG. 3 is a schematic diagram of an exemplary BCM according to aspects of the present disclosure.

As shown in FIG. 3, exemplary BMS 305 may include one or more of a main power monitor 310, a counter 315, a battery pack initialization module 320, a battery pack mode switching module 325, a battery temperature senor module 330, and/or a motor temperature senor module 340. Each of the components shown in FIG. 3 may be communicatively connected to one another (or other control subsystems) via a bus, or other wired or wireless communication link. Although described in the context of a BMS 305 that is integrated in a battery pack (e.g. battery pack 210), in other examples, one of more of these components may be distributed among various other control components or subsystems discussed herein.

In embodiments, the main power monitor 310 may be configured as hardware and/or software that detects when a main power (e.g. 12V) is established (or discontinued) between the vehicle and the battery that the BMS 305 is managing. This may reflect, for example, the vehicle being turned "on" by a driver (for establishing), or the vehicle being turned "off" by the driver (for discontinuing). In some examples, the main power monitor 310 (or separate charging module) may be configured as hardware and/or software that detects when a charging power is established (or discontinued) between a vehicle charger and the battery that the BMS 305 is managing. It is also noted that, in some examples, the vehicle control system may generate signals that replace and/or supplement the function of the main power monitor 310. For example, the vehicle control system may generate signals based on the vehicle being turned "on" or "off," and/or the vehicle control system may monitor the main power if the vehicle independently.

In embodiments, the counter 315 may be configured as hardware and/or software that responds to signals from the main power monitor (or other signal representing when the vehicle is turned "on" or "off"), and provides data to the battery pack initialization module 320 and/or the battery pack mode switching module 325. For example, the counter 315 may be configured to begin counting based at least in part on the main power monitor 310 determining that the main power between the vehicle and the battery is not detected. The counter 315 may take many forms, including various timing mechanisms and/or software routines. The BMS 305 may be configured to store BMS data to an electronic storage device (not shown) and/or to switch the battery to a shutdown mode based at least in part on the counter reaching a predetermined value. For example, the counter 315 may send counting data to the battery pack mode switching module 325, and the battery pack mode switching module 325 may be configured to initiate storage of the BMS data and/or switching the battery to a shutdown mode upon the counter reaching a predetermined value, such as the counter corresponding to a time in a range between 12 hours and 36 hours; or to a time of about 24 hours. Storing the BMS data prior to shutdown may be beneficial in allowing various subsystems to shut down without the loss of data that is necessary or beneficial for reactivation of the BMS and/or battery. By storing such data, energy requirements from the battery are thus reduced. In some examples, the shutdown mode may limit a current from the battery to about 1 mA or less.

In some examples, the a battery pack mode switching module 325 may also be configured to switch the battery to a standby mode based at least in part on the main power monitor 310 determining that the main power between the vehicle and the battery is not detected. The standby mode may, for example, limit battery output to certain systems, and may generally limit a current from the battery to a range of about 6 mA to 2 mA. In some examples, the standby mode may be further based on the counter 315 reaching a second predetermined value, which is less that the value for initiating the shutdown mode. For example, the standby mode may be initiated when the counter corresponds to a time of about 1 minute (or some multiple of minutes less than an hour), and the shutdown mode may be initiated when the counter corresponds to some number of hours (e.g. about 24 hours).

In some examples, the a battery pack mode switching module 325 (or the counter 315) may also be configured to reset the counter 315, e.g. when the main power monitor 310 detects reestablishment of the main power between the vehicle and the battery while the counter 310 is running. For example, the battery pack mode switching module 325 may be configured to send a reset signal to the counter 315, or the counter 315 may be configured to automatically reset based on a signal from the main power monitor 310.

In some examples, the a battery pack mode switching module 325 (or counter 315) may also be configured to adjust the predetermined counter values used to initiate the shutdown and/or standby modes. For example, if the main power monitor 310 detects reestablishment of the main power between the vehicle and the battery while the counter 310 is running, the predetermined times for initiating the shutdown and/or standby modes may be reduced by a percentage (e.g. 10%, 25% or 50%), by an amount based on the time that the main power between the vehicle and the battery is reestablished for, a portion of the time already counted, etc. This may be beneficial, for example, when the main power between the vehicle and the battery is only reestablished for a brief period of time, which may indicate that the vehicle has not been fully operated and shutdown or standby modes may be implemented without waiting for another full counter cycle.

In embodiments, the battery pack initialization module 320 may be configured to load the BMS data from the electronic storage device and/or to deactivate the shutdown (or standby) mode based at least in part on the main power monitor 310 determining that the main power between the vehicle and the battery is detected.

The BMS 305 may further include a battery temperature senor module 330, a motor temperature senor module 340, and various other modules related to monitoring and managing the operation of the battery being managed. For example, the battery temperature senor module 330 may be used to limit the output of the battery to maintain the operating temperature of the battery, and motor temperature senor module 340 may be used to manage battery heat dissipation functions. The BMS 305 may be configured to monitor and manage a range of battery-related functions, such as monitoring current in or out of the battery, the state of the battery, total voltage, voltages of individual cells, minimum and maximum cell voltage, average temperature, coolant intake temperature, coolant output temperature, temperatures of individual cells, state of charge, depth of discharge, etc. Additionally, the BMS 305 may be configured to calculate various values, such as maximum charge current, maximum discharge current, energy (kW) delivered since last charge or charge cycle, internal impedance of a cell, charge (A) delivered or stored, total energy delivered since first use, total operating time since first use, total number of cycles, etc. In some examples, any number of the detected or calculated values mentioned above may be stored (and retrieved) as BMS data.

The BMS 305 may be configured to protect the battery being managed by preventing (or inhibiting) it from operating outside its safe operating area, such as preventing over-current, over-voltage (e.g. during charging), under-voltage (e.g. during discharging), over-temperature, under-temperature, over-pressure, ground fault or leakage current, etc. Additional details regarding an exemplary circuit diagram for an individual BMS are shown in FIG. 4.

Figure 4:
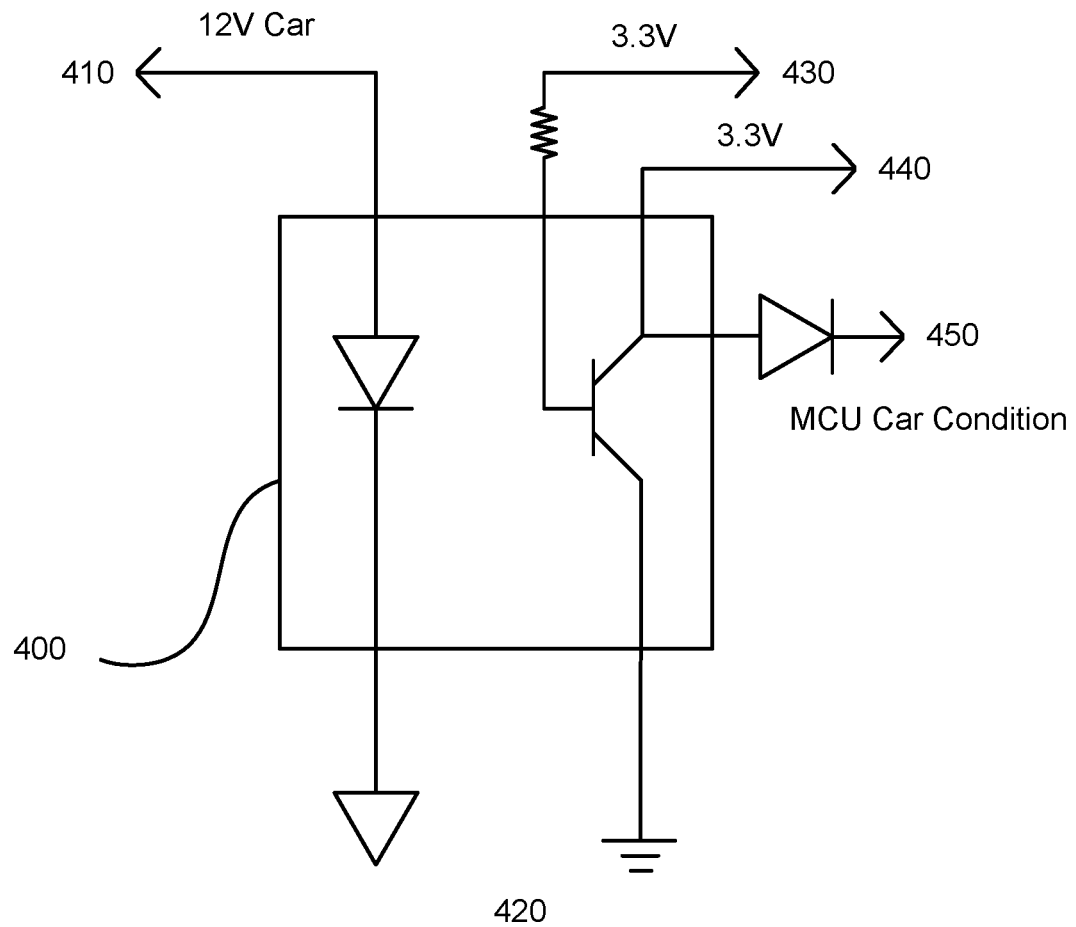
FIG. 4 is a partial circuit diagram of an exemplary BCM subsystem according to aspects of the present disclosure.

As shown in FIG. 4, BMS 305 may include circuitry 400 that provides main power 410 from the battery 420 to a vehicle (e.g. 12V), as well as a plurality of low-voltage control signal lines and monitoring channels 430-450, e.g. for communicating with a microcontroller (MCU), detecting conditions of the vehicle and/or battery. In some examples, a mcu_car_condition signal may be used in conjunction with the counter to initiate or cancel a shutdown (or standby mode). For example, when: mcu_car_condition=hi and the counter ≥24; then the BMS data may be saved, the battery pack switched to shutdown mode, and the counter reset to 0. Or, while in shutdown mode: when: mcu_car_condition=low and the counter=0; then the battery pack may be activated, and the BMS data retrieved and loaded back to the MCU.

Figure 5:
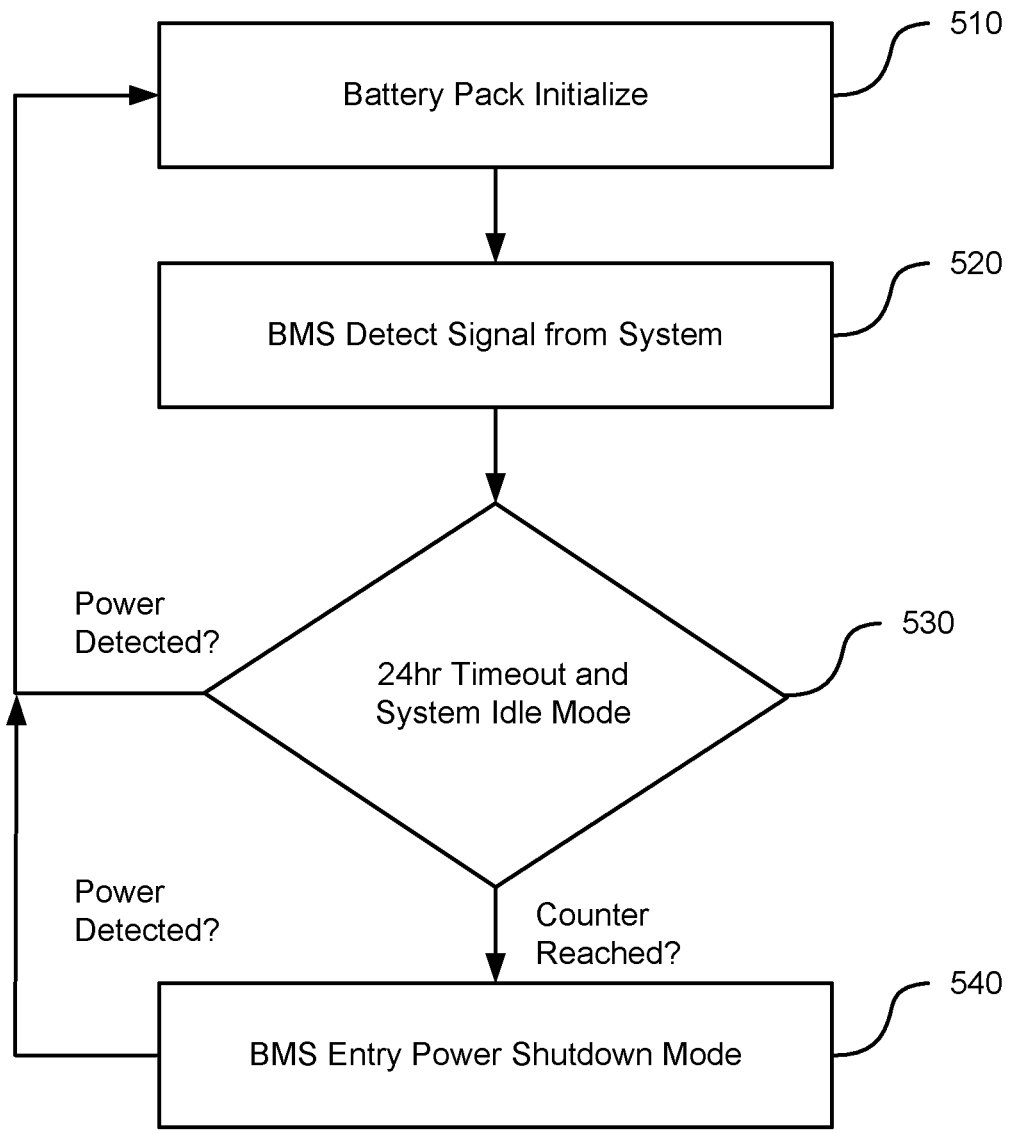
FIG. 5 is a flow diagram depicting aspects of an exemplary battery management method according to aspects of the present disclosure.
Figure 6:
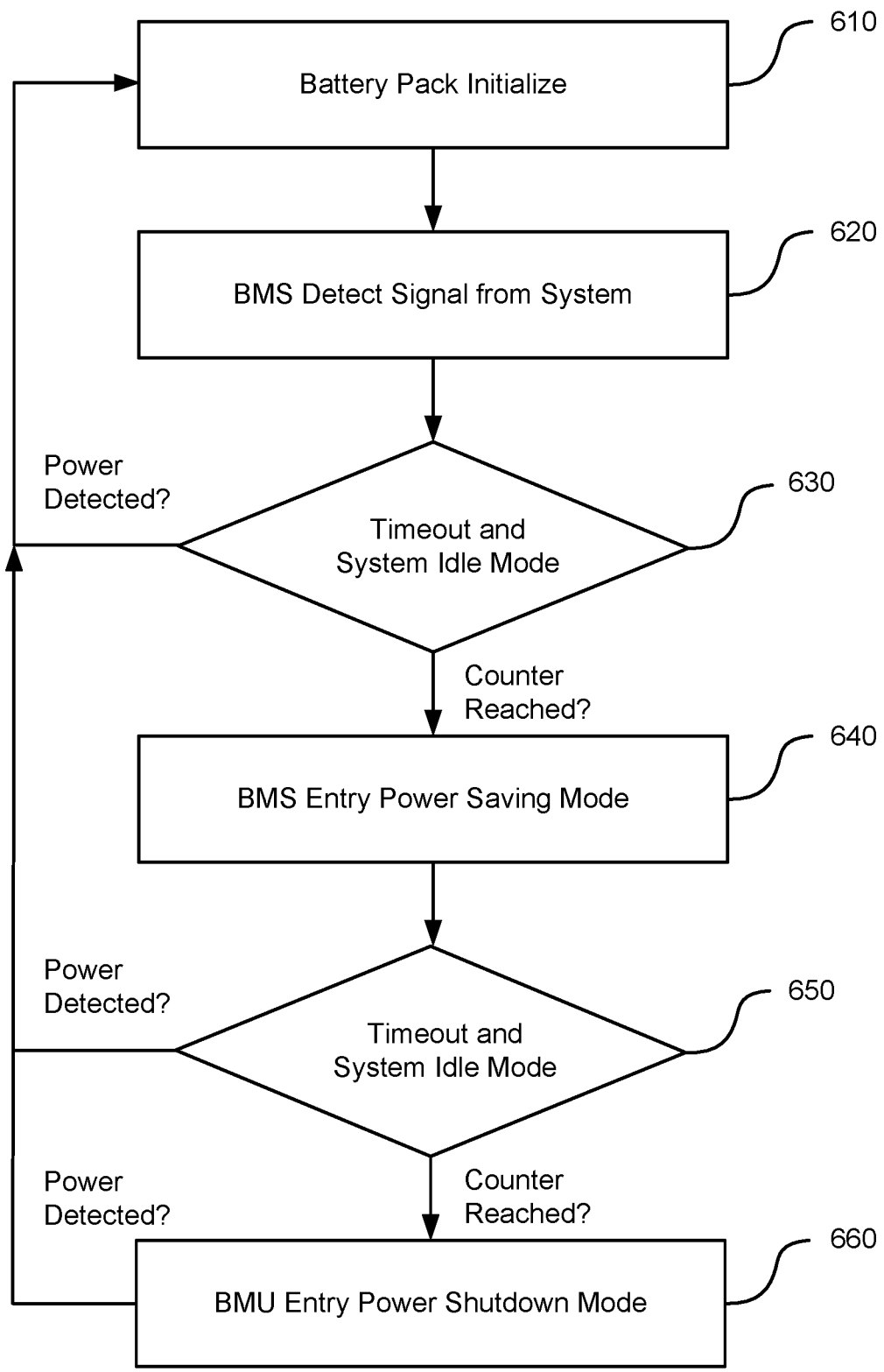
FIG. 6 is a flow diagram depicting aspects of another exemplary battery management method according to aspects of the present disclosure.

FIGS. 5 and 6 show flow diagrams of exemplary battery management methods according to aspects of the present invention. Each operation depicted therein may represent a sequence of operations that can be implemented in hardware or computer instructions implemented in hardware. In the context of computer instructions, the operations represent computer-executable instructions stored on one or more computer-readable storage media that, when executed by one or more physical processors, perform the recited operations. Generally, computer-executable instructions include routines, programs, objects, components, and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

As shown in FIG. 5, a battery management method may include operations related to determining whether to enter a shutdown mode. The flow may begin with 510, in which a battery pack is initialized. This may include, for example, activating the battery via BMS or other control system, connecting the battery with the vehicle powertrain, and/or loading BMS data from a storage device in to RAM or other memory of an MCU. Initialization may also include various status checks and/or diagnostic routines to determine the health of the battery, etc. Once the battery is initialized, a check may be performed that confirms and/or monitors the presence of main power between the battery and the vehicle. The flow may proceed with 520.

In 520, the BMS receives a signal from the vehicle controller, or other subsystem, reflecting, for example, that the vehicle has been turned off, that main power between the vehicle and the battery has been interrupted (or reduced to a predetermined threshold), and/or battery charging has been completed. As discussed further herein, this may come, for example, from a main power monitor, BMS, or vehicle control system. The flow may proceed with 530.

In 530, a timing routine may be initiated based on the signal received in 520. This may include, for example, initiating a counter, or other timer, that measures the time during which the vehicle is in an "off" state, and/or during which the main power between the vehicle and the battery is absent. During 530, various monitoring routines may also be executed, e.g. to determine whether the vehicle is switched to an "on" state, and/or if the main power between the vehicle and the battery is reestablished. If such monitoring routines, or appropriate signal(s), reflect that the vehicle is switched to an "on" state, and/or if the main power between the vehicle and the battery is reestablished, the flow may return to 510, in which the battery is reinitialized, e.g. by resetting the counter, loading the BMS data from storage, and/or activating the battery, as necessary. In some examples, 530 may also be responsive to a signal indicating that battery charging has commenced, and return to 510 until charging is completed.

If the timing routine reaches a predetermined value during 530 (i.e. without returning to 510), the flow may proceed to 540. The predetermined value may be, for example, a counter value corresponding to a matter of hours, e.g. a time between 12 hours to 36 hours, or about 24 hours. In some examples, the predetermined value may be adjusted by the BMS based on various criteria, such as how long the vehicle was in the "on" state, how long a previous timing sequence 530 lasted, whether the signal in 520 reflected the vehicle being turned off, main power between the vehicle and the battery being interrupted (or reduced to a predetermined threshold), and/or battery charging completed, etc.

In 540, the BMS may initiate a battery shutdown mode, including, for example, storing BMS data in an electronic storage device, and activating a shutdown mode, e.g. in which current from the battery is reduced, or limited, to about 1 mA or less. In some examples, certain batteries and/or cells may be managed by one or more BMS in different ways during shutdown operation. For example, when multiple batteries and/or cells are available, one of them may be used to continue providing power to one or more subsystems, while others are shut down completely. In some examples, the BMS may be configured to cycle different batteries and/or cells to different shutdown levels, e.g. to distribute any necessary "leakage" to different batteries at different times, and/or based on individual battery states.

The shutdown mode may continue, for example, until a signal reflecting that the vehicle has been turned on, that main power between the vehicle and the battery has been restored (or increased to a predetermined threshold), and/or battery charging has been initiated, at which point the flow may return to battery initialization in 510.

As shown in FIG. 6, another battery management method may include operations related to determining whether to enter a standby mode, followed by a more restrictive shutdown mode. The flow may begin with 610, in which a battery pack is initialized. This may include, for example, activating the battery via BMS or other control system, connecting the battery with the vehicle powertrain, and/or loading BMS data from a storage device in to RAM or other memory of an MCU. Initialization may also include various status checks and/or diagnostic routines to determine the health of the battery, etc. Once the battery is initialized, a check may be performed that confirms and/or monitors the presence of main power between the battery and the vehicle. The flow may proceed with 620.

In 620, the BMS receives a signal from the vehicle controller, or other subsystem, reflecting, for example, that the vehicle has been turned off, that main power between the vehicle and the battery has been interrupted (or reduced to a predetermined threshold), and/or battery charging has been completed. As discussed further herein, this may come, for example, from a main power monitor, BMS, or vehicle control system. The flow may proceed with 630.

In 630, a first timing routine may be initiated based on the signal received in 620. This may include, for example, initiating a counter, or other timer, that measures the time during which the vehicle is in an "off" state, and/or during which the main power between the vehicle and the battery is absent or reduced to a predetermined level. During 630, various monitoring routines may also be executed, e.g. to determine whether the vehicle is switched to an "on" state, and/or if the main power between the vehicle and the battery is reestablished. If such monitoring routines, or appropriate signal(s), reflect that the vehicle is switched to an "on" state, and/or if the main power between the vehicle and the battery is reestablished, the flow may return to 610, in which the battery is reinitialized, e.g. by resetting the counter, loading the BMS data from storage, and/or activating the battery, as necessary. In some examples, 630 may also be responsive to a signal indicating that battery charging has commenced, and return to 610 until charging is completed.

If the first timing routine reaches a first predetermined value during 630 (i.e. without returning to 610), the flow may proceed to 640. The first predetermined value may be, for example, a counter value corresponding to a matter of minutes, e.g. a time between 1 to 10 minutes, or 5 minutes, an hour, or other time that is less than the second predetermined value discussed further below. In some examples, the first predetermined value may be adjusted by the BMS based on various criteria, such as operational information about the vehicle, e.g. the average speed or recurring stops of the vehicle, battery state information, whether the signal in 620 reflected the vehicle being turned off, main power between the vehicle and the battery being interrupted (or reduced to a predetermined threshold), and/or battery charging completed, etc.

In 640, the BMS may initiate a battery standby mode, including, for example, deactivating certain vehicle subsystems, or otherwise reducing or limiting current from the battery to about 6 mA to 2 mA. In some examples, certain batteries and/or cells may be managed by one or more BMS in different ways during standby mode. For example, when multiple batteries and/or cells are available, one of them may be used to continue providing power to one or more subsystems, while others are deactivated (or placed in a shutdown mode as described further herein). In some examples, the BMS may be configured to cycle different batteries and/or cells to different standby and/or shutdown levels, e.g. to distribute any necessary "leakage" to different batteries at different times, and/or based on individual battery states. For example, if a standby mode is indicated, a battery having the greatest charge may be selected to enter the standby mode, powering necessary subsystems, while one or more other batteries are placed in shutdown mode.

In 650, a second timing routine may be initiated (or the first timing routine continued). This may include, for example, reinitiating (or continuing to monitor) the counter, or other timer, that continues to measure the time during which the vehicle is in the "off" state, and/or during which the main power between the vehicle and the battery is absent or reduced to a predetermined level. During 650, various monitoring routines may also be executed, e.g. to determine whether the vehicle is switched to an "on" state, and/or if the main power between the vehicle and the battery is reestablished. If such monitoring routines, or appropriate signal(s), reflect that the vehicle is switched to an "on" state, and/or if the main power between the vehicle and the battery is reestablished, the flow may return to 610, in which the battery is reinitialized, e.g. by resetting the counter, loading the BMS data from storage, and/or activating the battery, as necessary. In some examples, 650 may also be responsive to a signal indicating that battery charging has commenced, and return to 610 until charging is completed.

If the second timing routine 650 reaches a second predetermined value during 650 (i.e. without returning to 610), the flow may proceed to 660. The predetermined value may be, for example, a counter value corresponding to a matter of hours, e.g. a time between 12 hours to 36 hours, or about 24 hours (inclusive or exclusive of the first predetermined value). In some examples, the second predetermined value may be adjusted by the BMS based on various criteria, such as the state of an individual battery being managed, how long the vehicle was in the "on" state, how long a previous timing sequence 650 lasted, whether the signal in 620 reflected the vehicle being turned off, main power between the vehicle and the battery being interrupted (or reduced to a predetermined threshold), and/or battery charging completed, etc.

In 660, the BMS may initiate a battery shutdown mode, including, for example, storing BMS data in an electronic storage device, and activating a shutdown mode, e.g. in which current from the battery is reduced, or limited, to about 1mA or less. In some examples, certain batteries and/or cells may be managed by one or more BMS in different ways during shutdown operation, as discussed previously.

The shutdown mode 660 may continue, for example, until a signal reflecting that the vehicle has been turned on, that main power between the vehicle and the battery has been restored (or increased to a predetermined threshold), and/or battery charging has been initiated, at which point the flow may return to battery initialization in 610.

The present disclosure further provides an electric vehicle using the above-mentioned battery management systems and methods, the other parts of the electric vehicle can adopt the structure of existing electric vehicles, with a battery management system as described herein, and will not be repeated redundantly.

Although the present disclosure has been described with reference to the specific embodiments shown in the drawings, it should be understood that the lightweight fastening methods provided by the present disclosure can have a variety of variations without departing from the spirit, scope and background of the present disclosure. The description given above is merely illustrative and is not meant to be an exhaustive list of all possible embodiments, applications or modifications of the invention. Those of ordinary skill in the art should be still aware that, parameters in the embodiments disclosed by the present disclosure can be changed in different manners, and these changes shall fall within the spirit and scope of the present disclosure and the claims. Thus, various modifications and variations of the described methods and systems of the invention will be apparent to those skilled in the art without departing from the scope and spirit of the invention.

What is claimed is:

1. A vehicle battery management system (BMS), comprising:
    a main power monitor configured to detect a main power between a vehicle and a battery;
    a counter, configured to begin counting when the main power between the vehicle and the battery is not detected by the main power monitor; and
    a controller, configured to
        store BMS data to an electronic storage device and to switch the battery to a shutdown mode when the counter reaches a predetermined value, and
        load the BMS data from the electronic storage device when the main power between the vehicle and the battery is detected by the main power monitor.

2. The system of claim 1, wherein the predetermined value corresponds to a time period in a range between 12 hours and 36 hours.

3. The system of claim 2, wherein the predetermined value corresponds to a time period of about 24 hours.

4. The system of claim 1, wherein the shutdown mode limits a current from the battery to about 1 mA or less.

5. The system of claim 1, wherein the BMS is included in a battery pack including the battery.

6. The system of claim 1, wherein the controller is further configured to reset the counter when the main power between the vehicle and the battery is restored before the shutdown mode is deactivated.

7. The system of claim 6, wherein the controller is further configured to adjust the predetermined value for the counter when the counter is reset when the main power between the vehicle and the battery is restored before the shutdown mode is deactivated.

8. The system of claim 1, wherein the controller is further configured to switch the battery to a standby mode based when the main power between the vehicle and the battery is not detected by the power monitor, the standby mode limiting a current from the battery to a range of about 6 mA to 2 mA.

9. An electric vehicle, comprising:
    a battery;
    an electric motor configured to be powered by the battery; and
    a vehicle battery management system (BMS), including:
        a main power monitor configured to detect a main power between a vehicle and a battery;
        a counter, configured to begin counting when the main power between the vehicle and the battery is not detected by the main power monitor; and
        a controller, configured to
            store BMS data to an electronic storage device and to switch the battery to a shutdown mode when the counter reaches a predetermined value, and
            load the BMS data from the electronic storage device when the main power between the vehicle and the battery is detected by the main power monitor.

10. The vehicle of claim 9, wherein the predetermined value corresponds to a time period in a range between 12 hours and 36 hours.

11. The vehicle of claim 10, wherein the predetermined value corresponds to a time period of about 24 hours.

12. The vehicle of claim 9, wherein the shutdown mode limits a current from the battery to about 1 mA or less.

13. The vehicle of claim 9, wherein the BMS is included in a battery pack including the battery.

14. The vehicle of claim 9, wherein the controller is further configured to reset the counter when the main power between the vehicle and the battery is restored before the shutdown mode is deactivated.

15. The vehicle of claim 14, wherein the controller is further configured to adjust the predetermined value for the counter when the counter is reset based on the main power monitor determining that the main power between the vehicle and the battery is restored before activation of the shutdown mode.

16. The vehicle of claim 9, wherein the controller is further configured to switch the battery to a standby mode when the main power between the vehicle and the battery is not detected by the power monitor, the standby mode limiting a current from the battery to a range of about 6 mA to 2 mA.

17. The vehicle of claim 9, wherein the controller is further configured to control operating parameters if the battery during a working mode in which power is provided from the battery to the motor.

18. A method of managing output of a vehicle battery, comprising:
    monitoring a power state of a vehicle;
    detecting a first change in the power state of the vehicle reflecting at least one of the vehicle being turned off or a battery charging being completed;
    starting a counter based at least in part on the detection of the first change in the power state of the vehicle;
    storing BMS data to an electronic storage device, and switching the battery to a shutdown mode when the counter reaches a predetermined value;
    detecting a second change in the power state of the vehicle reflecting at least one of the vehicle being turned on or a battery charging being initiated;
    loading the BMS data from the electronic storage device and deactivating the shutdown mode when detecting the second change in the power state of the vehicle.

19. The method of claim 18, wherein the predetermined value corresponds to a time period in a range between 12 hours and 36 hours.

20. The method of claim 19, wherein the predetermined value corresponds to a time period of about 24 hours.

* * * * *